United States Patent [19]

Worrallo

[11] 4,056,985

[45] Nov. 8, 1977

[54] HINGE STRUCTURES

[76] Inventor: Anthony Charles Worrallo, 15 Sprott Road, Kohlmarama, Auckland 5, New Zealand

[21] Appl. No.: 659,124

[22] Filed: Feb. 18, 1976

[30] Foreign Application Priority Data

Feb. 21, 1975 New Zealand ........................ 176729

[51] Int. Cl.² ........................ F16H 55/04; E05D 9/00

[52] U.S. Cl. .................................... 74/435; 16/128 R

[58] Field of Search .................. E05D/15/00; 74/435, 74/384; 402/26; 16/128 R; 29/11

[56] References Cited

U.S. PATENT DOCUMENTS

| | | | |
|---|---|---|---|
| 2,830,479 | 4/1958 | Finn | 74/384 UX |
| 3,092,870 | 6/1963 | Baer | 16/128 R |

*Primary Examiner*—Leonard H. Gerin

*Attorney, Agent, or Firm*—Roylance, Abrams, Berdo & Kaul

[57] ABSTRACT

This invention relates to hinge structures.

According to the present invention there is provided a hinged structure comprising a first gear segment, a second gear segment meshing with the first gear segment, and a link pivotally connected to each gear segment, the axes of the gear segments co-inciding with the axes of the pivotal connections between the link and the gear segments.

9 Claims, 6 Drawing Figures

HINGE STRUCTURES

In a preferred constructional form, each gear segment includes a radial spoke in which there is formed a bore co-incident with the axis of the gear segment, said bore receiving an element which forms the means for pivotally connecting said link to that gear segment. Each element can be a pin which is push-fit in said bore or can be a screw.

For better understanding of the present invention, and to show how the same may be carried into effect, reference will now be made, by way of example, to the accompanying drawings, in which.

Figure 1:
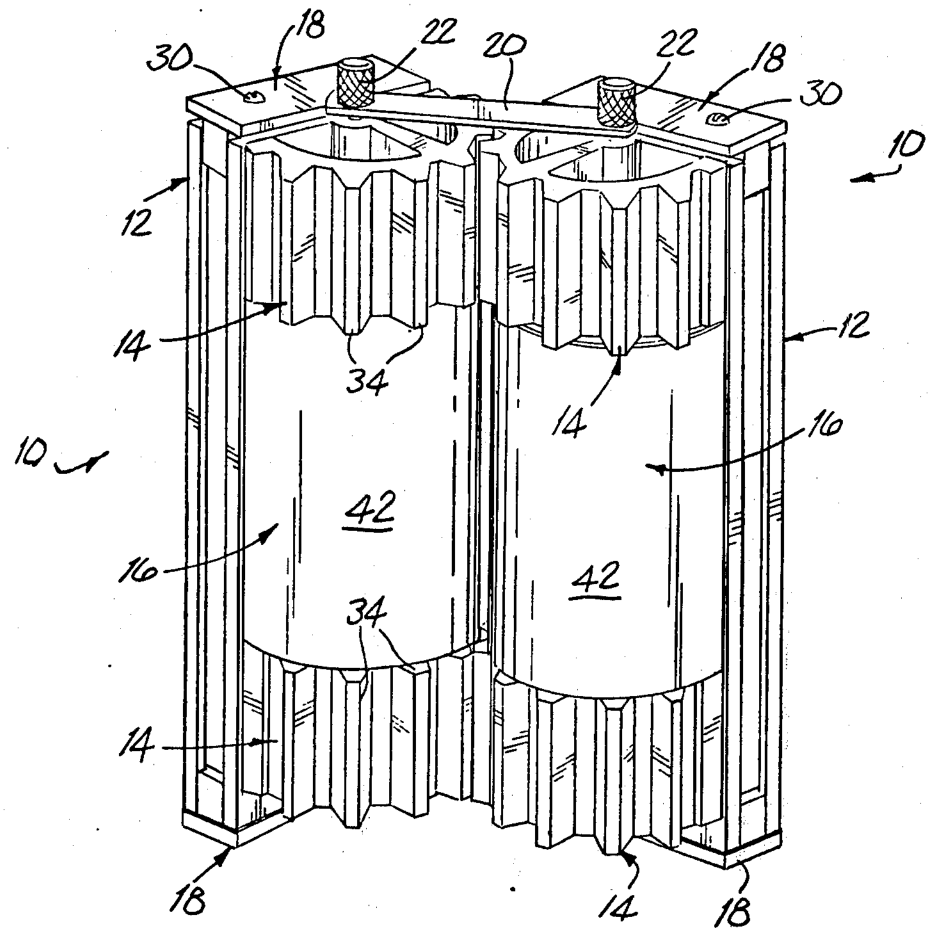
FIG. 1 is a pictorial view of a hinge structure.

The hinge structure shown in FIG. 1 comprises two identical hinge components each reference 10. Each hinge component comprises a base element 12, two gear segments 14, a spacer 16 and two end caps 18. Two links 20 (only the upper of which is visible) and four pins 22 (only the upper two of which are shown) join the hinge components 10 to one another.

Figure 2:
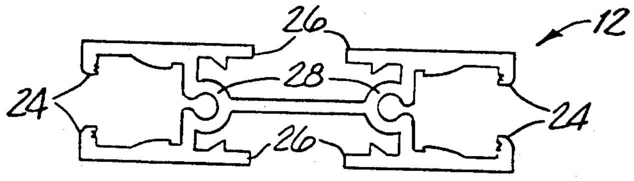
FIG. 2 is a plan view of a base element.

The base element 12 (FIG. 2) is in the form of a length of aluminium extrusion of generally H-shape. Edge portions 24 provide mountings for the end caps 18 and further edge portions 26 provide mountings for the segments 14 and the spacer 16. This will be described in more detail hereinafter. Semicircular portions of the extrusion define bores 28 which receive screws 30 (FIG. 1) to secure the end caps 18 in position. The screws 30 may be of the self-tapping type.

Figure 3:
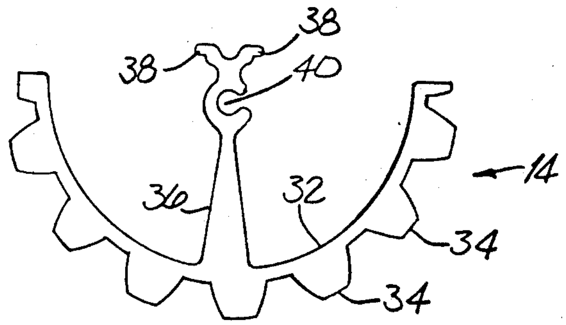
FIG. 3 is a plan view of a gear segment.
Figure 4:
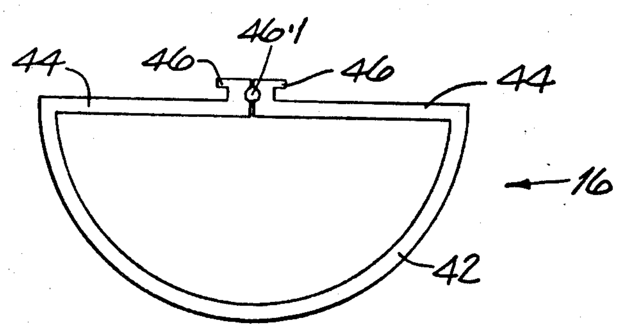
FIG. 4 is a plan view of a spacer.

The gear segment 14 shown in FIG. 3 comprises a curved portion 32 which has axially elongated teeth 34 on the outer face thereof. A diametrically extending spoke 36 is integral with the portion 32, the spoke joining the portion 32 mid-way between its ends. The free end of the spoke 36 is vee-shaped so as to provide two lips 38 which engage behind the edge portions 26 to locate the element 14 in place. At the centre about which the portion 32 is generated there is an axial bore 40 which is open along one side. By reference to the position of this bore it will clearly be seen that the portion 32 is somewhat greater than semi-circular in extent.

The spoke 36 can be elongated in the axial direction so that the length thereof in this direction is equal to the length of the portion 32 in the same direction. Alternatively, the spoke can be relatively short in the axial direction and only be provided at the upper ends of the upper segments 14 and at the lower ends of the lower segments 14. The former construction is preferred as it is mechanically stronger.

The spacer 16 is approximately D-shaped having a substantially semi-circular portion 42 and two limbs 44. The limbs terminate adjacent one another and along their free edges are formed with lips 46 which engage behind the edge portions 26. Semi-circular recesses 46.1 are formed in the facing surfaces of the lips 46. These permit a screw or other element to be driven-in to force the lips apart so as to enhance the frictional engagement between the edge portions 26 and the lips. This inhibits axial movement of the spacer 16.

Figure 5:
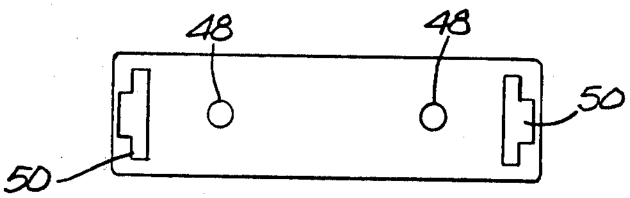
FIG. 5 is a plan view of an end cap.

The end cap 18 as illustrated in FIG. 5 has screw holes 48 which receive the screws 30. Legs 50 protrude from one face of the end cap 18 and each leg is T-shaped in section. The 'upright' of the 'T' fits between the edge portions 24 and the 'cross-bar' of the 'T' fits behind these edge portions. The dimensions of he legs 50 and of the base element 12 are such that the caps are push-fits in the ends of the base element. The screws 30 which pass through the bores 48 and into the bore 28 provide security against the end caps accidentally being detached from the base elements. In view of the fact that the end caps are push-fits sufficient security against accidental removal of the end caps can usually be provided by means of a single screw 30.

The hinge components 10 are secured together by the upper and lower links 20. Each end of each link 20 is secured to one of the components 10 by one of the pins 22. The pins 22 pass through apertures in the links and into the axial bores 40. As will clearly be seen in FIG. 1, the teeth 34 of the two upper segments 14 mesh as do the teeth of the lower segments. It will be understood that the axes of the pivotal connections between the links and the segments co-incide with the axes about which the portions 32 are generated.

The hinge structure illustrated can be used for a wide variety of purposes. For example, it can be employed to mount doors on supporting door posts or to connect together adjacent doors of a folding door structure. It can also be used to mount lids such as box lids and panels such as swing-down front panels of cabinets. Where, for example, a lid of fairly light weight is concerned, a single hinge structure as illustrated can be employed. For heavier structures such as doors etc., several spaced hinge structures can be used.

Figure 6:
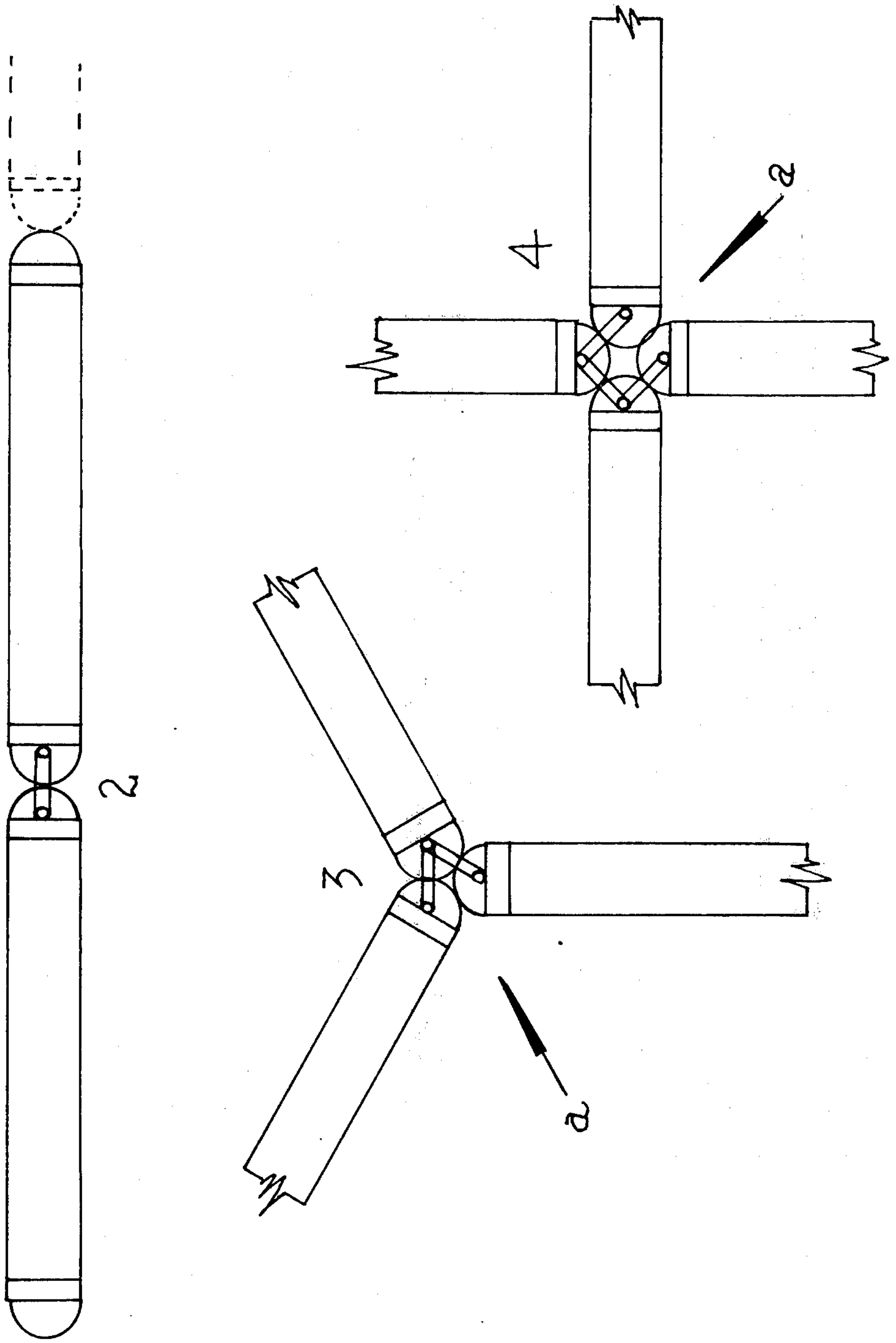
FIG. 6 illustrates the mode of use of the hinge structure.

A possible mode of use is illustrated in FIG. 6. In this Figure, one base element 12 is secured to a door post P and the other base element 12 is secured to a door D. If we assume that the post P is stationary then the door D can swing between the full line and chain dotted line positions illustrated through the position illustrated in dashed lines. During this movement the door D turns through a full 360° by virtue of the fact that the gear segments 14 act in the same way as planetary gears.

If desired, three or more hinge components can be employed in conjunction with one another. For example, where three are used, the links between the centre component and the two other components can overlap and a single pin can pass through the overlapping links.

In a form which has not been illustrated, each link has two pins integral therewith in contra distinction to the structure illustrated where the pins and links are separate items.

The outside diameter of the spacers can be such that their surfaces touch to form a light and draught excluding seal.

In a simpler form of the structure, which has not been illustrated, each hinge component includes a single gear segment mounted on a base. In other words, the second gear segment of each hinge component is omitted as is the spacer 16 and the base element is shortened commensurately. Two links 20 can be provided, these being attached to each end of the two gear segments. In this form the spoke 36 is of the same axial extent as the portion 32.

If factors such as loading make it desirable, each gear segment can be solid and slightly greater than cylindrical in extent.

What is claimed is:

1. A hinge structure comprising a first base element, a first gear segment non-rotatably carried by said first base element and having an axis of rotation, a second base element, a second gear segment having an axis of rotation, said second segment being non-rotatably carried by the second base element and meshing with the first gear segment, a swinging link, axle means pivotally connecting said link to the first gear segment for swinging motion with respect to the first base element about said axis of rotation of the first gear segment, and axle means connecting said link to the second gear segment for swinging motion with respect to said second base element about said axis of rotation of the second segment.

2. A hinge structure according to claim 1, wherein each gear segment includes a radial spoke having a bore aligned with said axis of rotation of the gear segment for receiving said axle means for pivotally connecting said link to that gear segment.

3. A hinge structure according to claim 2, wherein said axle means is a pin which is a push-fit in a respective one of said bores.

4. A hinge structure as claimed in claim 2, wherein each of said elements is a screw.

5. A hinge structure according to claim 2 and including first and second hinge components, wherein the first and second gear segments are releasably mounted on the first and second base elements, respectively.

6. A hinge structure as claimed in claim 5, wherein each base element is formed with a slot extending in the direction of the axis of the gear segment mounted thereon, the slot being bounded by a pair of edge portions, and wherein the gear segment has a pair of oppositely directed lips, said lips fitting behind said edge portions to retain the segment in place.

7. A hinge structure as claimed in claim 6, wherein said lips are formed at the end of the spoke remote from its junction to the remainder of the gear segment, said spoke passing through said slot.

8. A hinge structure as claimed in claim 5, wherein each hinge component comprises a pair of axially spaced, co-axial gear segments with a spacer there between, said gear segments and said spacer all being mounted on said base element.

9. A hinge structure as claimed in claim 8, and including two links, there being a link joining each meshing pair of gear segments.

* * * * *